United States Patent [19]

Noothout et al.

[11] 4,011,289
[45] Mar. 8, 1977

[54] MANUFACTURE OF MICROGLOBULES

[75] Inventors: Arend Jaman Noothout, Oosterbeek; Otakar Votocek, Arnhem, both of Netherlands

[73] Assignee: Reactor Centrum Nederland, The Hague, Netherlands

[22] Filed: Jan. 22, 1974

[21] Appl. No.: 435,506

Related U.S. Application Data

[63] Continuation-in-part of Ser. No. 284,061, Aug. 28, 1972, abandoned.

[30] Foreign Application Priority Data

Aug. 26, 1971 Netherlands .................. 7111738

[52] U.S. Cl. .................... 264/.5; 149/114; 252/301.1 R; 252/301.1 S; 264/12; 264/15; 423/251; 423/261; 423/249; 423/252

[51] Int. Cl.² .............. G21C 21/00; C09K 3/00; G21C 19/46

[58] Field of Search ............ 252/301.1 S, 301.1 R, 252/317; 264/.5, 12, 15; 423/251, 252, 249, 261; 149/114

[56] References Cited

UNITED STATES PATENTS

| | | |
|---|---|---|
| 3,290,122 | 12/1966 | Clinton et al. ......... 252/301.1 S X |
| 3,312,632 | 4/1967 | Smith ..................... 252/301.1 S |
| 3,331,898 | 7/1967 | Haas et al. ............... 264/.5 |
| 3,586,742 | 6/1971 | Chin et al. ............. 252/301.1 S X |
| 3,617,585 | 11/1971 | Haas et al. ............... 264/.5 |
| 3,669,632 | 6/1972 | Kanij et al. ........... 252/301.1 S X |
| 3,709,963 | 1/1973 | Cogliati ................... 264/.5 |
| 3,717,581 | 2/1973 | Noothout .............. 252/301.1 S |
| 3,728,421 | 4/1973 | Noothout .............. 252/301.1 S |
| 3,748,274 | 7/1973 | Rankin et al. ......... 252/301.1 S |
| 3,812,049 | 5/1974 | Noothout et al. ....... 252/301.1 S |

*Primary Examiner*—Benjamin R. Padgett
*Assistant Examiner*—T. S. Gron
*Attorney, Agent, or Firm*—Cushman, Darby & Cushman

[57] ABSTRACT

Uniform microspheres substantially or completely free from internal cavities and voids are prepared by spraying an aqueous hydrated metal oxide solution onto the surface of a water-immiscible organic liquid containing from 0.04 to 2.0 percent by volume of a surface active agent, the viscosities of each of the organic and inorganic phases plus the amount of surface active agent within the above range being selected such that there is sufficient surface active agent present to prevent the globules from adhering to each other yet an insufficient amount to prevent deformation from the substantially spherical shape.

5 Claims, 6 Drawing Figures

MANUFACTURE OF MICROGLOBULES

CROSS REFERENCE TO RELATED APPLICATION

This application is a continuation-in-part of our earlier application Ser. No. 284,061 filed Aug. 28, 1972, and now abandoned.

BACKGROUND OF THE INVENTION

The present invention relates to a method of manufacturing microglobules by forming a dispersion of droplets of an inorganic phase in an organic phase which is immiscible with water, such that the droplets of the inorganic phase solidify. The solidified droplets are subsequently separated from the organic phase, washed, dried, and optionally subjected to further heat treatment. The watery phase contains inorganic hydrated oxides or components from which they can form and, if required, finely divided carbon. The organic phase is immiscible with water; it has a temperature ranging from 50° to 150° C. and contains, if required, ammonia or an ammonia-releasing agent. With regard to the above, there are several methods in which to dispose the aqueous inorganic phase into or onto the immiscible organic phase and in principle any method of dispersion for manufacturing microglobules is suitable.

Examples of dispersing methods include injection of the inorganic phase into the organic liquid, spraying in the form of droplets over the surface of the organic liquid, and mixing the two phases with the aid of stirrers or the like. Injection may be performed both at the lower end of a column of organic liquid and at the upper end thereof, depending on the respective densities of the two liquids.

Suitable liquids which contain hydrated inorganic oxides include silicon-dioxide sols, hydroxide sols of metals, watery metal-salt solutions, anion-deficient metal-salt solutions, or mixtures of these liquids. The watery phase contains finely divided carbon if carbide particles are to be prepared from the product obtained.

The watery phase or the organic phase optionally contains one or more ammonia-releasing agents, such as urea, hexamethylene tetramine, acetamide, ammonium carbamate, ammonium cyanate or mixtures of such ammonia-releasing agents.

The manufacture of $UO_2$ microglobules according to one of the prior procedures mentioned above does not produce a consistently uniform and acceptable product. Specifically, defects, principally in the form of cavities, occur in $UO_2$ globules having an average size of 80–120 microns after sintering. These cavities were presumably caused by the fact that the organic liquid was included therein while the droplets were being formed. According to the method of preparation previously used, one part by volume of a nitrate-deficient uranyl-nitrate solution, $UO_2(OH)_{0.5}(NO_3)_{1.5}$, of 2.85-molar concentration, was mixed, while cooling was being applied, with 1.2 parts by volume of a solution which was 3-molar with respect to both hexamethylene tetramine and urea. The mixed solutions were injected through a cooled stainless steel capillary having a diameter of 0.5 millimeter into an organic liquid at a temperature of 70° C. The globules so produced after separation, washing and sintering exhibited holes and internal cavities after the sintering operation. As a result, the sintered end product had a closed porosity of 6 to 10 percent.

According to U.S. Pat. No. 3,586,742 to Chin et al, oxide microspheres are prepared by injecting droplets of an aqueous metal oxide sol, such as uraniumthorium oxide, into an organic liquid immiscible with the sol, such as kerosene and carbon tetrachloride. The patent states that a surfactant may be added to the organic liquid to prevent coalescing of the droplets and thereby maintain the droplets in the dispersed state. The patent does not exemplify such surfactants, identify suitable surfactants or indicate a suitable quantity needed to prevent coalescing of the droplets.

DETAILED DESCRIPTION OF THE INVENTION

Figure 1:
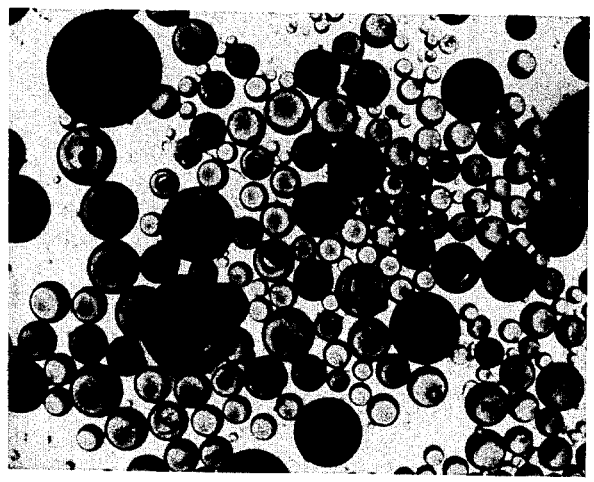

We have now found that internal voids and cavities in the microglobules can be avoided by including a surface active agent in the organic phase and with judicious selection of the concentration of the surface active agent, the viscosity of the organic phase, the temperature of the organic phase and the viscosity of the aqueous phase and thus microspheres or microglobules of uniform configuration and free or substantially free of voids are produced.

The minimal SAS concentration as used herein is a concentration at which the microglobules that are being formed and solidifying just fail to adhere to each other. Generally speaking, the minimum amount is about 0.04 percent by volume. When a certain maximum concentration is exceeded, such as about 2.0 volume percent, a deviation from the globular shape appears. The preferred range is from 0.5 to about 2.0 percent by volume. The invention, as appears from the above, is particularly suited to the production of small microglobules having a diameter ranging from about 5 to about 250 microns.

We have found that a relatively high viscosity organic liquid is necessary for obtaining good microglobules without cavities and dents. Thus, the viscosity of the organic liquid at the working temperature must be at least 0.5 centipoise and may range up to at most about 10 centipoise, also taken at the working temperature.

The optimum and maximum concentration of surface active substance may be determined experimentally. We have found that this concentration is a function of the respective viscosities of the watery phase, the organic phase and the SAS itself and that the concentration of the surface active substance decreases with an increase in the viscosity of both the aqueous phase and the organic liquid. It is here assumed that the SAS is a liquid; the viscosities of these three substances limit the maximum SAS concentration. The maximum SAS concentration is an important factor in process control. Along with the solid globules that are segregated, SAS is continuously entrained outside the organic phase. If, as a result of this entrainment the SAS concentration drops below the minimum value, the globules begin to adhere to each other. In practice, therefore, the procedure is implemented near the maximum emulsifier concentration, and the relation, which is to be determined experimentally, is particularly important.

The watery phase optionally contains one or more of the above ammonia-releasing agents as is known in the art.

If it is desired to prepare globules of refractory metal oxides, the inorganic phase may consist of metal-hydroxide sols, watery metal-salt solutions, anion-deficient metal-salt solutions or mixtures of these liquids.

Suitable metal cations are selected from the group of: $Fe^{+2}$, $Fe^{+3}$, $Al^{+3}$, $Be^{+2}$, $(ZrO)^{+2}$, $(HfO)^{+2}$, $(TiO)^{+2}$, $Sc^{+3}$, $Y^{+3}$, trivalent rare-earth cations, $U^{+4}$, $(UO_2)^{+2}$, $Th^{+4}$, $Pu^{+4}$, $(PuO_2)^{+2}$ and actinide cations which may have higher atomic numbers than Pu. The anions of such metals may be anyone of $Cl'$, $NO_3'$, $SO_4''$, formiate or acetate. One may also use silicon-dioxide sols, separately or mixed with the abovementioned liquids.

A suitable method of manufacturing microglobules consists in spraying by means of sprayers of a watery phase with a viscosity $\geq$ 12 centipoises at 0° C. over an organic phase having a preassigned SAS concentration. It should be noted that the maximum emulsifier concentration in the organic phase at this relatively low viscosity of the inorganic phase is restricted only by the viscosities of SAS and organic phase. The following Table A lists examples of combinations of organic liquids and various SAS compositions. Other similar combinations are also useful.

Table A

| System | Viscosity of organic liquid, Centipoises 20° C | Viscosity of organic liquid, Centipoises 90° C | Viscosity of SAS, centipoises at 20° C | Concentration of SAS at which deformation begins in percent by volume |
| --- | --- | --- | --- | --- |
| liquid paraffin + Span 80 | 136 | 8.5 | 95–1100 | 0.5–0.6 |
| Dobane + Span 80 | 11.0 | 1.7 | 95–1100 | 0.9 |
| Dobane + Span 85 | 11.0 | 1.7 | 170–230 | 2.0 |
| Dobane + Atlox 3386 | 11.0 | 1.7 | 2000–5000 | 0.5 |

Span 80, 85 and Atlox 3386 are products of Atlas Chemical Corporation who also supplied the viscosity data. Liquid parafin is a substantially aliphatic hydrocarbon liquid fraction of petroleum.

Dobane PT-12 is generally a mixture of alkylaryl-substituted hydrocarbons and is commercially characterized as one or more alkyl-substituted benzenes having in the side chain an average of about 12 carbon atoms sold by Shell Netherland.

The invention will be further illustrated and described by the attached photographs and examples.

EXAMPLE 1

Preparation of Microglobules by Injection Through a Capillary

An aqueous nitrate-deficient uranyl-nitrate solution, 1 part by volume $UO_2(NO_3)_{1.6}(OH)_{0.4}$, of 2.85-molar concentration, was mixed, while cooling was being applied, with 1.2 parts by volume of a cooled watery solution which was 3-molar with respect to both hexamethylene tetramine and urea. The mixed solution was injected through a metal capillary into an organic liquid. The dispersing apparatus consisted of a stainless-steel vessel equipped with a capillary of 30 mm in length and a bore of approx. 0.5 mm. During the injecting operation the capillary protruded into the organic phase. At 2.2 atm. pressure, 88 ml of the aqueous solution per minute was injected. The organic phase was composed of a mixture of tetrachloroethylene and white liquid paraffin; the temperature of the organic phase was 70° C; the density at 70° C was 1.25.

The globules removed from the organic phase exhibited holes and internal cavities after drying followed by a sintering step at 1300° C, in mixed gas (75 percent of $N_2$ and 25 percent of $H_2$).

Figure 2:
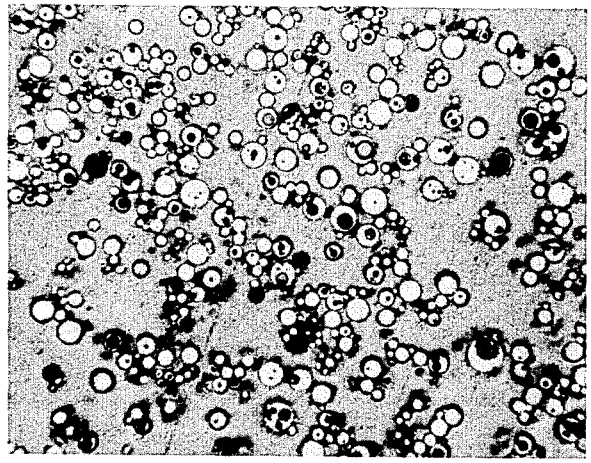

The attached photographs, FIGS. 1 and 2, show visually the defects of the products so produced.

FIG. 1 illustrates the solidified droplets segregated from the organic phase; FIG. 2 is a polished section of the same globules upon completion of the sintering step. As will be apparent from the figures the product obtained was of poor quality.

EXAMPLE 2

Dispersion in Air By Spraying

Figure 3:
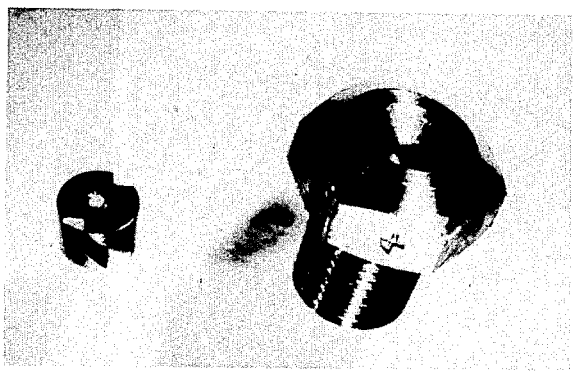

For the dispersion in air, stainless-steel sprayers manufactured by Lechler were used. In order to attain an average droplet diameter of 300 microns, the type SZO 0.8/60 (0.8 mm. bore, 60° spray angle) and SZO 1.2/90 (1.2 mm. bore, 90° spray angle) were selected. The photograph attached as FIG. 3 shows at the left a Lechler sprayer and at the right a spray piece contained in this sprayer, of which the central opening is shut off in order to limit the output to some extent.

The same mixed solutions as described in Example 1 were sprayed in the cooled state. The average diameter of the product could be adjusted within certain limits by means of the spraying pressure used. For example a spraying pressure of 1.05–1.1 atm. yielded particles having an average diameter of 100 microns after sintering to virtually the theoretical density. A screen analysis indicated that the particle-size distribution in the sintered product is aptly described as a log-normal distribution. The geometric standard deviation is found to be much smaller when injecting by means of sprayers. Using a capillary, as in Example I, this amounts to 1.6–1.7, and with the use of sprayers to 1.4.

The reproducibility of the spraying method is good, as the following Table B indicates. Table B summarizes the results of screen analysis of four successively prepared batches using a bath size of about 140 g of $UO_2$ per batch.

The output amounted to 286 ml/hour at a pressure of 1.1 atm. By comparison, the output according to the abovedescribed capillary method amounted to 88 ml/hour at a pressure of 2.2 atm. Thus higher output at reduced pressure was obtained using the spraying method.

TABLE B

| Screen size, microns | Percent by Weight of $UO_2$ globules 1 | 2 | 3 | 4 |
| --- | --- | --- | --- | --- |
| +175 | 4.3 | 3.3 | 4.2 | 5.2 |
| 150 – 175 | 8.0 | 5.0 | 6.5 | 6.8 |
| 125 – 150 | 11.9 | 11.8 | 10.7 | 12.4 |
| 105 – 125 | 23.3 | 23.2 | 24.5 | 23.8 |
| 90 – 105 | 12.8 | 12.8 | 12.4 | 13.0 |
| 75 – 90 | 12.5 | 13.4 | 12.7 | 13.6 |
| –75 | 27.3 | 30.4 | 28.9 | 25.2 |

Defects in Globules

Figure 4:
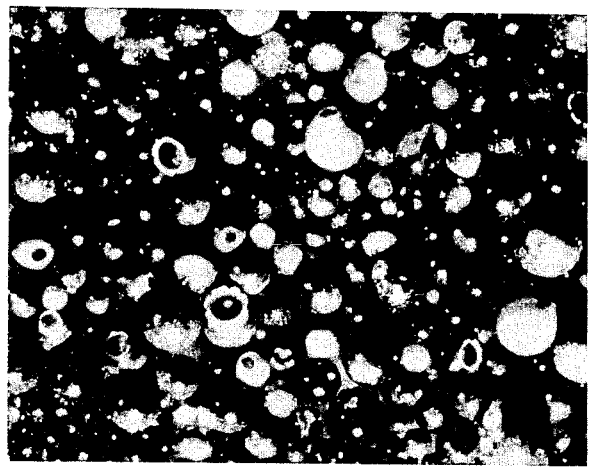

The first experiments were repeated with sprayers this time with a mixture of white liquid paraffin and tetrachloroethylene at approximately 90° C (d 90° = 1.3 g./cu. cm.) which contained 0.2 percent by volume of Span 80. Although this dispersing technique brought considerable improvement, cavities, holes and dents were still observed. A photograph of this product is attached as FIG. 4. The number of remaining defects was determined to be other than a function of the distance (5–45 cm.) from the sprayer to the surface of the organic phase. From this information we concluded that the remaining defects were the result of the contact of droplets with the organic phase.

Viscosity of the Organic Phase

Shellsol A and white liquid paraffin were selected as the organic liquids for organic phase for the spraying tests as the two liquids have approximately the same density at 90° C ($d_{Sh}$ 90° C = 0.80 g./cu.cm; $d_{par}$ 90° C = 0.83 g./cu.cm.) and differ widely from each other in viscosity ($\eta_{Sh}$ 90° C = 0.57 centipoise; $\eta_{par}$ 90° C. = 8.5 centipoise, respectively).

A number of experiments with mixtures of these liquids has demonstrated that most cavities, dents and holes occur at low viscosity. For instance in the mixtures with a viscosity over 1 centipoise (90° C) the number of defects decreases. The internal cavities disappear first, and then the dents as well. At viscosities above 2 centipoises the defects occur almost exclusively in the largest globules (approx. 400 microns and over).

In principle, therefore, a liquid of a relatively high viscosity like liquid paraffin is preferable to liquids of low viscosity like Shellsol A, Shellsol T, tetrachloroethylene, etc.

On the other hand, an emulsifier content above 0.2 percent by volume in a liquid of high viscosity can cause serious variations from the globular shape. Serious deviations from the globular shape are visible in the photograph attached and identified as FIG. 5.

A mixture of liquid paraffin and tetrachloroethylene with a viscosity higher than 2 centipoises (90° C) is favorable, but there are drawbacks of a different nature. First among these are the toxicity and high vapor tension of tetrachloroethylene. Furthermore, the high boiling point and the high viscosity (20° C = 140 centipoises) of liquid paraffin can be objectionable in any waste processing that may have to be performed.

Preference is therefore given to a special hydrocarbon fraction, Dobane PT-12, which is marketed under this name by Shell Chemie. Dobane PT-12 is fundamentally an alkylaryl-substituted hydrocarbon compound with an average of 12 carbon atoms per molecule. The viscosity of Dobane PT-12 merely drops from $\eta$ = 11.0 centipoises at 20° C to $\eta$ = 1.7 centipoises at 90° C. The density amounts of 0.865 and 0.818 g./cu.cm. at 20° and 90° C, respectively. The boiling point is 280° C. For these reasons the alkylaryl-substituted hydrocarbon compounds illustrated by Dobane PT-12 are preferred.

Influence of the Kind of SAS and of The HLB Number

The following experiments, which are summarized in Table C, were performed with a SAS concentration of 0.04 percent by volume at a temperature of 90° C of the organic phase. The HLB number is the hydrophile - lipophile balance number.

The aqueous phase was as in Example 1. Span 85 is composed of sorbitan trioleates; Span 80 is composed of sorbitan mono-oleates and Atlox 3386 is based on polyoxyethylene sorbitol fatty acids esters and alkyl aryl sulfonate blends.

TABLE C

| Organic liquid | SAS | HLB number of SAS |
| --- | --- | --- |
| Shellsol A | Span 80 | 4.3 |
| Shellsol B | Span 20 | 8.6 |
| Shellsol T | Span 80 | 4.3 |
| White liquid paraffin + tetrachloro-ethylene d 90° = 1.30 g/cu.cm. | Span 80 | 4.3 |
| Dobane PT-12 | Span 80 | 4.3 |
| Dobane PT-12 | Span 85 | 1.8 |
| Dobane PT-12 | Atlox 3386 | 9.6 |

The quality of the globules, with respect to the presence of defects, was found to be independent of the identity and the HLB number of the SAS, at a concentration of 0.04 percent by volume.

Example of a Dispersion

On the basis of the above-mentioned data, the dispersion step was carried out according to the following conditions to produce globules with an average diameter of 100 microns. Uranium solution: Nitrate-deficient uranyl nitrate [U] = 3M, $$\frac{NO_3'}{U} = 1.5 - 1.6 \quad ,$$

Mixing ratio: $\frac{\text{vol. of uranium solution}}{\text{vol. of 3M hex}_a + \text{3M urea}} = \frac{1}{1.4}$ to $\frac{1}{1.5}$.

Temperature of the mixture for dispersion: −2° C to −5° C.

Organic phase: Dobane PT-12 + 0.2 percent by volume of Atlox 3386.

Temperature of organic phase: 93° – 96° C.

Type of sprayer: SZO 0.8/60 or SZO 1.2/90 (Lechler) stainless steel with closed central opening in the spray chamber as illustrated in FIG. 3.

Spraying pressure: 1.1 atm. during dispersing operation.

Distance of sprayer: 5–15 cm. from surface of organic phase.

Output: 280 – 290 ml. of mixture/minute.

Residence time in the organic phase: As brief as possible, so as to prevent the extraction of residues of hexamethylene diamine, urea and base-decompositions products in the organic phase.

Figure 6:
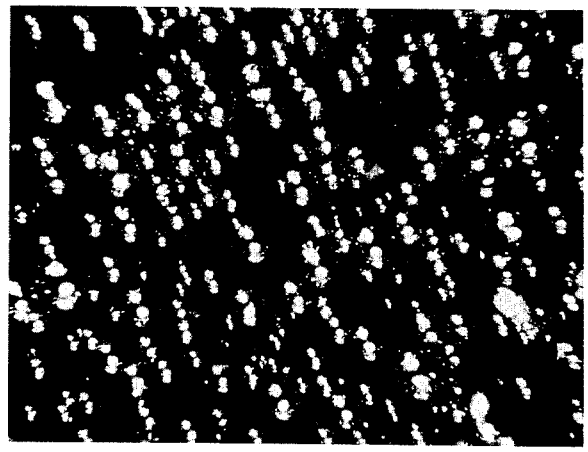

After solidification, the globules so produced were segregated from the organic phase, eluted with ammonia solution, dried and sintered. The sintering operation was performed in 25 percent of $H_2$ + 75 percent of $N_2$ at 1300° C. FIG. 6 is a photograph of the product.

Influence of the Respective Viscosities Of Organic Phase and SAS

The use of a minimal quantity of SAS (approx. 300 p.p.m.) is necessary for preventing the globules from adhering to each other. Since adsorption of SAS takes place at the surface of the globules, another addition of SAS is required after the dispersion of a given amount of uranium solution. For practical reasons, therefore, a higher initial concentration was used: approx. 0.1 – 0.2 percent by volume.

Figure 5:
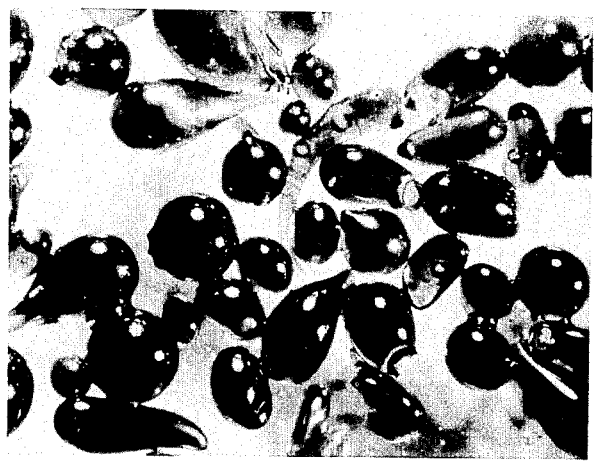

It has been found that, whereas "classic defects" (FIG. 2 or FIG. 1) are almost entirely absent, still higher concentrations of SAS result in serious variations from the globular shape (FIG. 5). This phenomenon arises in different systems at different concentrations of SAS; see the following Table D.

Next we attempted to establish a correlation between this phenomenon and the interfacial tension $\gamma$ in the system. The $\gamma$ as a function of the SAS concentration was measured with the aid of a stalagmometer at 20° C.

TABLE D

| System | Viscosity of Organic Liquid (centipoises) 20° C | Viscosity of Organic Liquid (centipoises) 90° C | Viscosity of SAS (Centipoises) 20° C | Viscosity of mixture of Organic Liquid + SAS (centipoises) 20° C | Viscosity of mixture of Organic Liquid + SAS (centipoises) 90° C | Concentration of SAS at which the malformation sets up percent by volume |
|---|---|---|---|---|---|---|
| Paraffin + Span 80 | 136 | 8.5 | 95–1100 | 136 | 8.5 | 0.5–0.6 |
| Shellsol A + Span 80 | 1.0 | 0.58 | 95–1100 | 1.0 | 0.58 | 1.6 |
| Dobane + Span 80 | 11.0 | 1.7 | 95–1100 | 11.0 | 1.7 | 0.9 |
| Dobane + Span 85 | 11.0 | 1.7 | 170–230 | — | — | 2.0 |
| Dobane + Atlox 3386 | 11.0 | 1.7 | 2000–5000 | — | — | 0.5 |

Viscosity data was again supplied by published information of Atlas Chemical Company The graphs of $\gamma$ as a funtion of SAS concentration and the data of Table D indicate that the globule malformation arises at relatively low $\gamma$. In some cases, there is no agreement or correlation between the SAS concentration at which malformation occurs and that where $\gamma$ reaches the lowest value, for instance the system of Shellsol A and Span 80. A direct relationship between a given $\gamma$ value and the appearance of malformation therefore is not present.

On the other hand, a certain measure of correlation was established between the viscosity of the organic liquid, the viscosity of the added emulsifier and the emulsifier concentration at which the malformation arises. Specifically, the higher the new viscosities of the organic phase and of the emulsifier, the lower is the emulsifier concentration at which the malformation can be expected.

This might lead to the conclusion that the viscosity of the mixture is higher than the viscosity of the single components. It appears nevertheless from the measurements that the viscosity has not increased as a result of the addition of the emulsifier; see Table D. It follows from Table D that there is a correlation between the maximum SAS concentration in the organic phase and the viscosities of organic phase and SAS itself when a watery phase with a viscosity $\geq$ 12 centipoises at 0° C is dispersed in this organic phase.

What is claimed is:

1. In a process for preparing microspheres which includes dispersing into an organic phase droplets of an inorganic aqueous phase having a viscosity $\geq$ 12 centipoise at 0° C which inorganic aqueous phase comprises an hydrated metal oxide selected from the group consisting of metal oxides of actinide metals, lanthanide metals, yttrium and scandium, into a water-immiscible organic phase having a temperature of from 50° to 150° C and having a viscosity at said temperature of between about 0.5 and about 8.5 centipoise, whereby the surface tension maintains said droplets in a spherical shape as they solidify, then removing the thus formed microspheres, the improvement of making small microglobules substantially devoid of internal voids and surface dents thereon, comprising, in combination:

a. incorporating in said organic phase a surface active agent in an amount of between about 0.04 and 2.0 percent by volume based on the volume of said organic phase, said amount selected such that forming and solidifying microspheres just fail to adhere to each other while at the same time said microspheres retain their spherical shape during formation, and b. spraying the inorganic aqueous phase into an atmosphere above the organic phase so to disperse the formed droplets over and onto the surface of said organic phase, thereby producing said small microglobules having a diameter ranging from about 5 to about 250 microns.

2. The process of claim 1 wherein said inorganic aqueous phase has finely divided carbon therein.

3. The process of claim 1 wherein said inorganic aqueous phase contains an ammonia releasing agent therein.

4. The process of claim 1 wherein said organic phase contains an ammonia releasing agent therein.

5. The process of claim 2 wherein the thus formed and separated microspheres contain carbon, and the separated microspheres are thereafter sintered.

* * * * *